(12) United States Patent
Pesetsky et al.

(10) Patent No.: US 9,302,276 B2
(45) Date of Patent: Apr. 5, 2016

(54) PARTICLE SEPARATION DEVICE

(75) Inventors: Serge Pesetsky, Shenzhen (CN); Chad J. Caparros, Shenzhen (CN); Chuan Hui Fang, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 795 days.

(21) Appl. No.: 13/550,927

(22) Filed: Jul. 17, 2012

(65) Prior Publication Data

US 2013/0319918 A1  Dec. 5, 2013

(30) Foreign Application Priority Data

May 31, 2012  (CN) .......................... 2012 1 0176809

(51) Int. Cl.
| | |
|---|---|
| *B04C 5/08* | (2006.01) |
| *B04C 5/13* | (2006.01) |
| *B04C 5/185* | (2006.01) |
| *B04C 5/28* | (2006.01) |
| *B01D 21/26* | (2006.01) |
| *B01D 21/00* | (2006.01) |
| *F24D 19/00* | (2006.01) |
| *B03C 1/28* | (2006.01) |
| *B03C 1/033* | (2006.01) |
| *B03C 1/30* | (2006.01) |

(52) U.S. Cl.
CPC .............. *B04C 5/28* (2013.01); *B01D 21/0009* (2013.01); *B01D 21/267* (2013.01); *B03C 1/0332* (2013.01); *B03C 1/286* (2013.01); *B03C 1/30* (2013.01); *B04C 5/08* (2013.01); *B04C 5/13* (2013.01); *B04C 5/185* (2013.01); *F24D 19/0092* (2013.01); *B01D 2221/02* (2013.01); *B03C 2201/18* (2013.01); *B03C 2201/28* (2013.01)

(58) Field of Classification Search
CPC ............ B04C 5/08; B04C 5/13; B04C 5/185; B04C 5/28; B01D 21/0009; B01D 21/267; B01D 2221/02

See application file for complete search history.

(56) References Cited

U.S. PATENT DOCUMENTS

| | | |
|---|---|---|
| 2,671,560 A | 3/1954 | Fontein et al. |
| 2,734,630 A | 2/1956 | Van Der Wal |
| 4,726,902 A | 2/1988 | Hubbard |
| 6,596,169 B1 | 7/2003 | Rong et al. |
| 8,020,707 B2 | 9/2011 | Kim et al. |
| 2004/0149667 A1 | 8/2004 | Meyer |
| 2006/0162299 A1 | 7/2006 | North |

(Continued)

FOREIGN PATENT DOCUMENTS

| | | |
|---|---|---|
| GB | 1090978 A | 11/1967 |
| GB | 1557743 A | 12/1979 |
| WO | WO 2008/155649 A1 | 12/2008 |

*Primary Examiner* — David A Reifsnyder
(74) *Attorney, Agent, or Firm* — Muncy, Geissler, Olds & Lowe, P.C.

(57) ABSTRACT

A particle separation device includes a particle separation member having a plurality of conical cavities each having a narrow open end and a wide open end for separating particles from unclean liquid; a fluid distribution member for distributing the liquid to the cavities; a particle collection member for collecting particles; and a fluid guiding member for guiding cleaned liquid from the particle separation member to an outlet of the device. The particle collection member includes a chamber and a magnet for holding particles inside the chamber. A vortex finder is disposed in each of the cavities. The vortex finder has a skirt portion and a distal end having a reduced wall thickness.

16 Claims, 3 Drawing Sheets

(56) References Cited

U.S. PATENT DOCUMENTS

| | | |
|---|---|---|
| 2010/0069217 A1 | 3/2010 | Aoki et al. |
| 2010/0213118 A1 | 8/2010 | Tandon |
| 2010/0326895 A1 | 12/2010 | Mongadoddy et al. |
| 2011/0100923 A1 | 5/2011 | Jassal et al. |
| 2013/0008840 A1* | 1/2013 | Pesetsky et al. ........... 210/512.2 |

* cited by examiner

PARTICLE SEPARATION DEVICE

CROSS REFERENCE TO RELATED APPLICATIONS

This non-provisional patent application claims priority under 35 U.S.C. §119(a) from Patent Application No. 201210176809.0 filed in The People's Republic of China on May 31, 2012.

FIELD OF THE INVENTION

This invention relates to a particle separation device and in particular, to a particle separation device for a water system such as a domestic water supply system or a domestic central heating system.

BACKGROUND OF THE INVENTION

Big cyclonic separation devices are widely used in industry, such as used in oil refineries to separate oils and gases and used in swimming pools to separate particles from water, through vortex separation.

There are few small particle separation devices in the market. However, dirt, debris such as $Fe_2O_3$ and $Fe_3O_4$ and sludge already present in central heating systems as well as deposits from heat exchange will cause failure of the boiler system, especially the pump.

The objective of the present invention is to provide a new small particle separation device for a water system such as a domestic water supply system or central heating system.

SUMMARY OF THE INVENTION

Accordingly, in one aspect thereof, the present invention provides a particle separation device comprising: a particle separation member configured for separating particles from unclean liquid, the particle separation member comprising a plurality of cavities each having a narrow open end, a wide open end and a conical part between the narrow and wide ends; a fluid distribution member configured for distributing unclean liquid to the cavities; a particle collection member in communication with the narrow open ends of the cavities of the particle separation member and configured for collecting particles; and a fluid guiding member in communication with the wide open ends of the cavities of the particle separation member configured for guiding the liquid from the particle separation member to an outlet of the device; wherein the particle collection member comprises a chamber and a magnet fixed with respect to the chamber for holding particles inside the chamber.

Preferably, the magnet is a ring magnet detachably fixed at an inner or outer surface of the chamber.

Preferably, the particle collection member comprises a drain closed by a valve.

Preferably, a vortex finder is disposed between the wide open end of each of the cavities of the particle separation member and the fluid guiding member, the vortex finder comprising a cylindrical body, a skirt portion, a distal end with a reduced wall thickness adjacent the skirt portion remote from the fluid guiding member and a central passage forming a path for the liquid to pass from the cavity to the fluid guiding member.

Preferably, the distal end of the vortex finder has an inclined inner surface.

Preferably, the wide open end of each cavity further comprises a cylindrical extension portion, the skirt portion of the vortex finder being disposed in the cylindrical extension portion of a corresponding cavity.

Preferably, the fluid distribution member comprises a plurality of distribution passages each having a start section, a cylindrical distal section connected to the cylindrical extension portion of a corresponding cavity, and a transition section connected between the start section and the distal section, the transition section joining to the cylindrical distal section in a tangential.

Preferably, the bottom surface of transition section facing the particle separation member is curved.

Preferably, an entry channel that is completely located outside of the chamber of the particle collection member.

Preferably, the entry channel comprises an inlet section extending in a radial direction of the particle separation member, an outlet section extending in an axial direction of the particle separation member, the outlet section having a conical distal end the diameter of which gradually increases in a direction away from the inlet section, and the start sections of the distribution passages are connected to the conical distal end.

Preferably, the fluid distribution member further comprises a protrusion located between the start sections of the distribute passages, the protrusion having a curved surface facing the conical distal end of the entry channel.

According to a second aspect thereof, the present invention also provides a particle separation device comprising: a particle separation member configured for separating particles from unclean liquid, the particle separation member comprising a plurality of cavities each having a narrow open end, a wide open end and a conical part between the narrow and wide open ends; a fluid distribution member configured for distributing the liquid to the cavities; a particle collection member in communication with the narrow open ends of the cavities of the particle separation member and configured for collecting particles separated from the liquid; a fluid guiding member configured for guiding the liquid from the particle separation member to an outlet of the device; and a vortex finder disposed between the wide open end of each of the cavities of the particle separation member and the fluid guiding member; wherein each vortex finder has a cylindrical body with a central passage communicating the cavities with the fluid guiding member, a skirt portion and a distal end adjacent the skirt portion and having a reduced wall thickness, the skirt portion being located at the wide open end of the corresponding cavity.

Preferably, the wide open end of each of the cavities further comprises a cylindrical extension portion extending in a direction away from the narrow open end, the skirt portion being located in the cylindrical extension portion of the corresponding cavity.

Preferably, the distal end of the vortex finder has an inclined inner surface.

Preferably, pressure sensors are respectively disposed in the particles separation member and fluid guiding member, and a pH sensor is disposed in the fluid guiding member.

Preferably, an entry channel is located outside of the chamber of the particle collection member, and the particle separation member is integrally formed with a plurality of voids and walls formed between the voids and the voids are respectively used as the cavities and the entry channel.

Preferably, the particle separation member, fluid guiding member, and particle collection member are made from transparent or translucent materials.

Preferably, the materials are thermally stable plastics materials.

Preferably, surfaces of the materials for guiding liquid are modified with polymers selected from the group of fluorodecyl polyhedral oligomeric silsesquioxanes.

Preferably, the plastics materials are reinforced with mica particles, glass fibers or carbon micro and nano-fibers.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
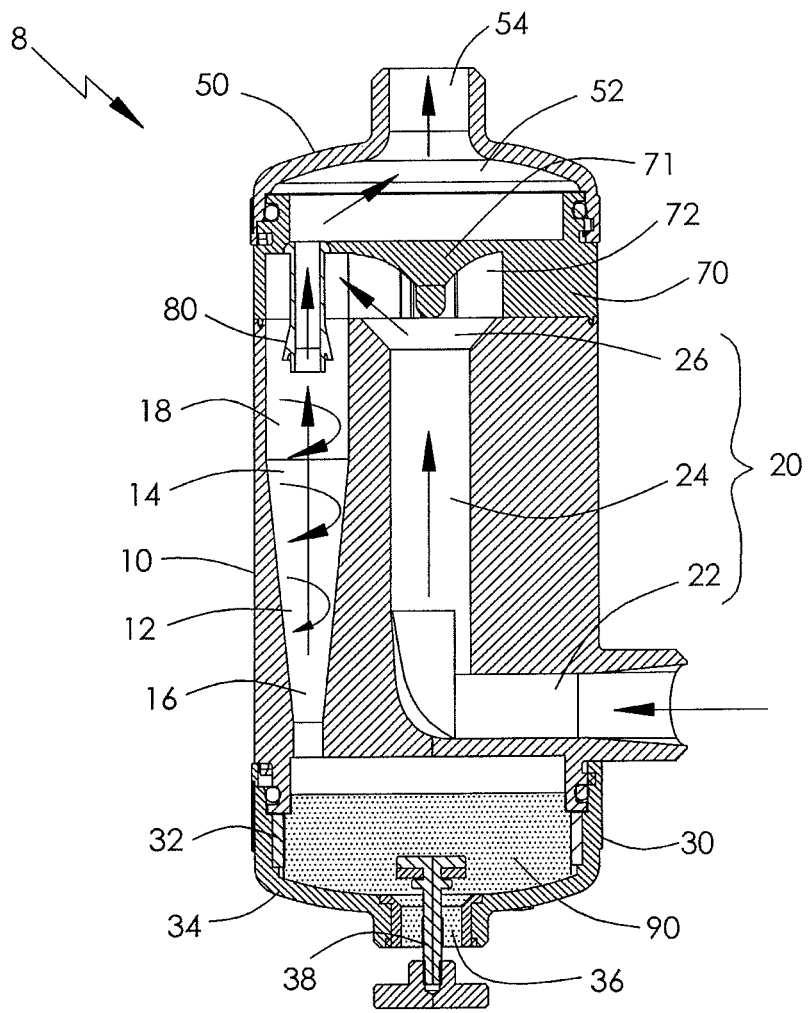
FIG. 1 is a sectional view of a particle separation device in accordance with a preferred embodiment of the present invention.
Figure 2:
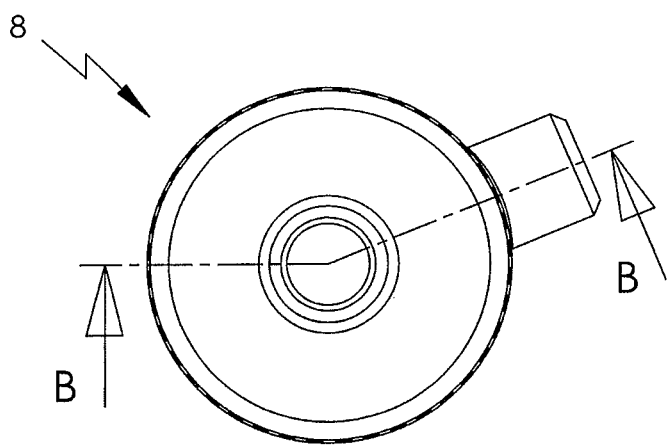
FIG. 2 is a plan view of the particle separation device of FIG. 1.

FIGS. 1 to 4 illustrate a particle separation device 8 according to a preferred embodiment of the present invention. The particle separation device comprises a particle separation member 10 configured for separating particles from unclean liquid, a particle collection member 30 in communication with the particle separation member 10 and configured for collecting particles separated from the liquid by the particle separation member 10, and a fluid guiding member 50 in communication with the particle separation member 10 configured for guiding clean liquid coming from the particle separation member 10 to an outlet 54 of the device. The liquid flows in a direction as indicated by arrows of FIG. 1.

The particle separation member 10 comprises a plurality of cavities 12 each having a wide open end 14 and a narrow open end 16. A conical portion is formed between the wide and narrow open ends 14, 16. Preferably, the wide open end 14 further comprises a cylindrical extension portion 18 extending away from the narrow open end 16.

The particle separation member 10 further comprises an entry channel 20 for receiving unclean liquid, and a fluid distribution member 70 configured for distributing the unclean liquid to the particle separation member 10. Preferably, the entry channel 20 is located outside of the particle collection member 30. In this embodiment, the entry channel 20 has an L shape and comprises an inlet section 22 extending in a radial direction of the particle separation member 10 and an outlet section 24 extending in an axial direction of the particle separation member 10. The inlet section 22 is located close to the particle collection member 30. The distal end 26 of the outlet section 24 has a conical shape the diameter of which gradually increases in a direction away from the inlet section 22.

Figure 3:
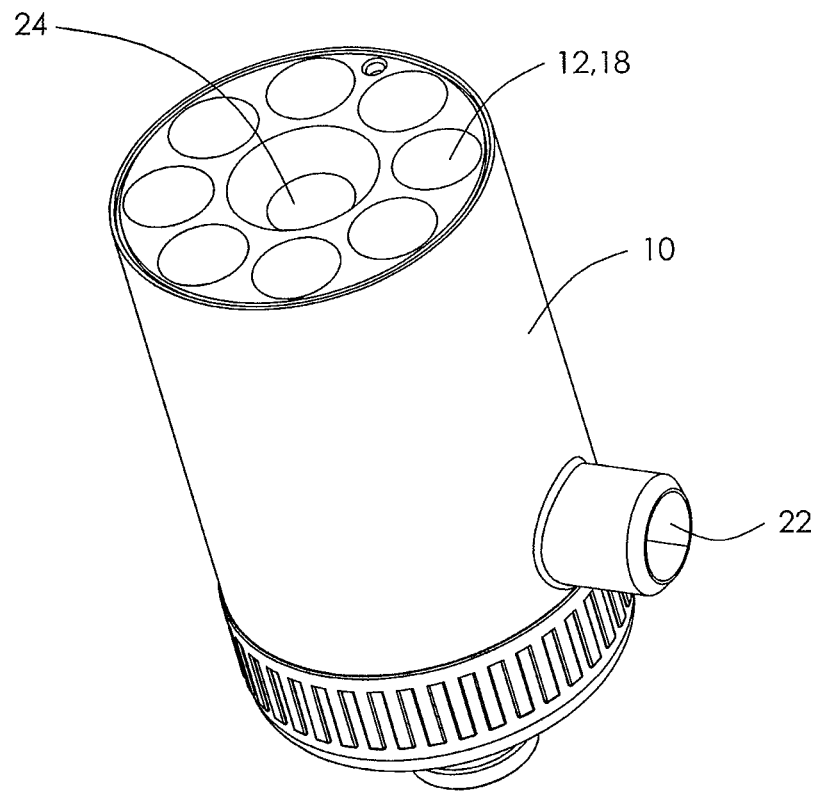
FIG. 3 illustrates the particle separation device of FIG. 1, with a fluid guiding member and a fluid distribution member removed.

FIG. 3 shows the particle separation device with the fluid guiding member and the fluid distribution member removed to more clearly show the cavities of the particle separation member 10. The cavities 12 surround the outlet section 24 of the entry channel 20. Preferably, the particle separation member 10 is integrally formed with a plurality of voids and walls formed between the voids as a single injection molding. The voids are respectively used as the cavities 12 and the entry channel 20. The integrally formed particle separation member 10 has good rigidity to thereby reduce vibration when liquid flows through the particle separation member 10. In order to avoid varied deformation at different portions, due to material shrinkage during molding, portions of the walls formed between the cavities 12 and the entry channel 20 may be removed to reduce the thickness of the walls.

Figure 4:
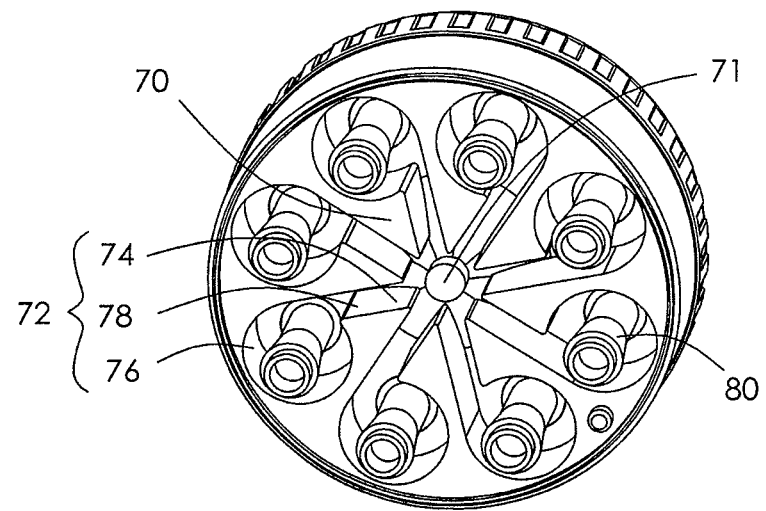
FIG. 4 illustrates the fluid distribution member of the particle separation device of FIG. 1.

FIG. 4 is an internal view of the fluid distribution member 70 showing a plurality of distribution passages 72, each having a start section 74 connected to the conical distal end 26 of the entry channel 20, a cylindrical distal section 76 connected to the extension portion 18 of a corresponding cavity 12, and a transition section 78 connected between the start section 74 and distal section 76. The transition section 78 joins the cylindrical distal section 76 in a tangential direction of the cylindrical distal section 76. Preferably, the bottom surface of transition section 78 facing the particle separation member 10 is curved in order to reduce resistance to the liquid flowing through the fluid distribution member 70. The fluid distribution member 70 further comprises a guiding structure. The guiding structure comprises a protrusion 71 located between the start sections 74 of the distribution passages 72. The protrusion 71 has an curved surface facing the conical distal end 26 of the entry channel 20.

Figure 5:
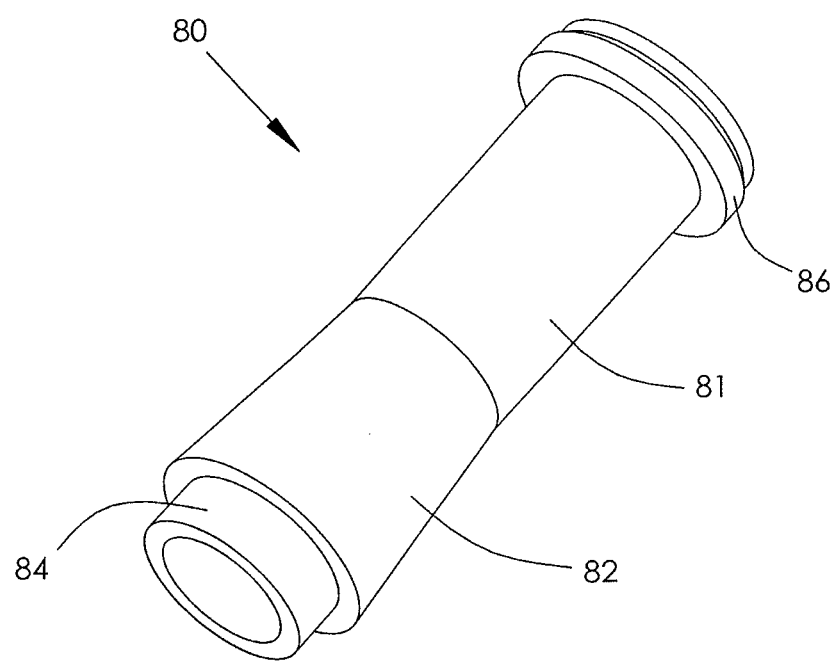
FIG. 5 illustrates a vortex finder of the particle separation device of FIG. 1.
Figure 6:
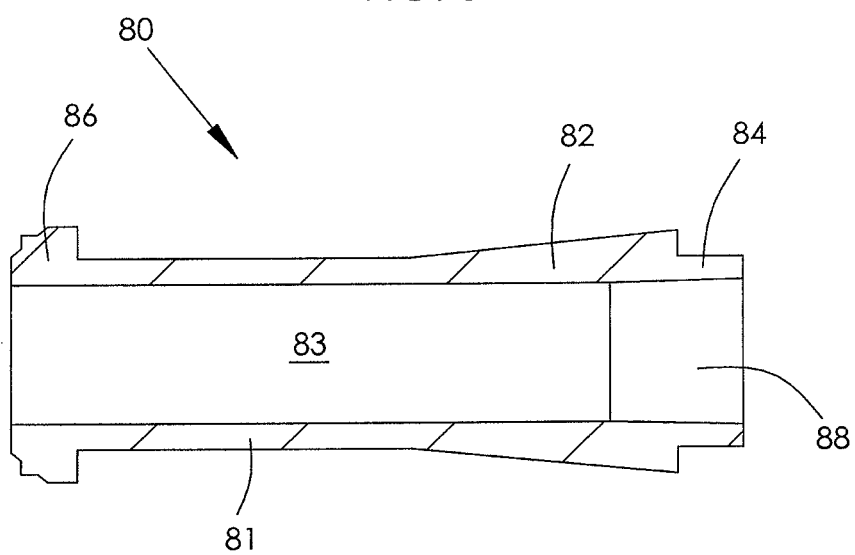
FIG. 6 is a sectional view of the vortex finder of FIG. 5.

Referring to FIGS. 1, 5 and 6, a vortex finder 80 is arranged at a joint between each cavity 12 and the chamber 52 of the fluid guiding member 50. Each vortex finder 80 comprises a cylindrical body 81, a skirt portion 82 with an outer diameter gradually increased in a direction away from the fluid guiding member 50 and a central passage 83 forming a path for he liquid to pass from the cavity 12 into the chamber 52. The vortex finder has a distal end 84 having a reduced wall thickness, extending from the end of the skirt 82 in a direction away from the fluid guiding member 50. The wall thickness of the distal end 84 is less than the largest thickness of the skirt portion 82. Preferably, the outer diameter of the distal end 84 is less than the largest outer diameter of the skirt portion 82. The skirt portion 82 is located in the cylindrical extension portion 18 of the corresponding cavity 12. The vortex finder 80 further comprises a mounting portion 86 fixed to the fluid guiding member 50.

In use, unclean liquid is introduced into the entry channel 20 from a pressurized source, such as a pump. The liquid flows to the cylindrical extension portions 18 of the cavities 12 via the distribution passages 72. Liquid is directed toward the narrow open ends 16 of the cavities 12 in a helical pattern forming a vortex traveling down the cavity. The particles are spin outwardly through centrifugal force and then drop under gravity into the particle collection member 30 via the narrow open ends 16. When the liquid approaches the narrow open ends 16, the vortex changes direction and moves up towards and through the vortex finders and into the fluid guiding member 50. At the point where the vortex changes direction the liquid reaches a point of zero vertical motion, at which point the particles carried by the liquid continue to move in a downward direction and drop into the chamber 34 of the particle collection member through the narrow open ends 16. In this embodiment, the cylindrical extension portion 18 of the cavity 12 stabilizes the liquid coming from the fluid distribution member 70. The skirt portion of the vortex finder 82 accelerates the flow of the liquid as the liquid flows through the cylindrical extension portion 18. The distal end 84 of the vortex finder with the reduced wall thickness may create mild turbulence allowing small eddy currents to form at the end of the skirt portion 82 to provide better separation between the down vortex and the up vortex to thereby reduce cross flow of liquid carrying particles entering the central passage of the vortex finders 80 directly. Preferably, the inner surface 88 of the distal end 84 of the vortex finder 80 is inclined to reduce the wall thickness of the end of the vortex finder 80 further.

Referring to FIG. 1, the particle collection member 30 is sealingly connected to the particle separation member 10. The particle collection member 30 comprises a closed chamber 34 for receiving particles 90 from the particle separation member 10. A ring magnet 32 is fixed at the inner surface of the chamber 34 for holding magnetic particles and non-magnetic particles mixed with magnetic particles in the chamber 34. Preferably, the particle collection member 30 is detachably fixed to the particle separation member 10 to allow the magnet 32 to be taken out for cleaning. Alternatively, the magnet 32 may be detachably fixed to the outer surface of the chamber 34. The ring magnet 32 may be replaced by a plurality of individual magnets. The chamber 34 comprises a drain 36 for discharging particles there through. A valve 38 is arranged at the drain 36 for opening or closing the drain 36.

Preferably, the particle separation member 10, particle collection member 30, fluid guiding member 50 and the fluid distribution member 70 are made of transparent or translucent material such that the inside of the particle separation device is visible. Being transparent means that the time for cleaning can be determined by a simple visual inspection. In this embodiment, the particle separation member 10, particle collection member 30, fluid guiding member 50 and the fluid distribution member 70 are made of a plastics material with good thermal stability such as polyurethane. Thus, the particle separation device may be used to filter hot water as well as cool or cold water. Preferably, the plastics material is reinforced with mica particles, glass fibers or carbon micro and nano-fibers. Surfaces of the material for guiding liquid may be modified with polymers selected from the group of fluorodecyl polyhedral oligomeric silsesquioxanes.

Alternatively, the particle separation member 10, particle collection member 30, fluid guiding member 50 and the fluid distribution member 70 may be made of metal.

Preferably, pH sensors or pressure sensors may be disposed inside the chamber 52 of the fluid guiding member 50. Pressure sensors may be disposed inside of the particle separation member 10. Monitoring the pH allows the general condition of the water system to be observed. The pressure drop the particle separation device indicates the condition of the device, a large pressure drop indicates a blockage or time for cleaning whereas too low a pressure drop may indicate a blockage elsewhere in the system or even a pump failure.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A particle separation device comprising:
an inlet pipe receiving liquid from a source;
a particle separation member configured for separating particles from liquid, the particle separation member comprising a plurality of cavities each having a narrow open end, a wide open end and a conical part between the narrow and wide ends;
a fluid distribution member configured for distributing the liquid to the cavities and connected to the inlet pipe;
a particle collection member in communication with the narrow open ends of the cavities of the particle separation member and configured for collecting particles;
a fluid guiding member in communication with the wide open ends of the cavities of the particle separation member configured for guiding the liquid from the particle separation member to an outlet at a top end of the device; and
a drain connected to the particle collection member,
wherein the particle collection member comprises a chamber and a ring magnet fixed with respect to the chamber, wherein the drain is centered with respect to the ring magnet and drains parallel to the outlet through a bottom end of the device, and wherein the inlet pipe enters the particle separation member perpendicular to a direction of flow at the drain and the outlet.

2. The device of claim 1, wherein the ring magnet is detachably fixed at an inner or outer surface of the chamber.

3. The device of claim 1, wherein the drain is closed by a valve.

4. The device of claim 1, wherein a vortex finder is disposed between the wide open end of each of the cavities of the particle separation member and the fluid guiding member, the vortex finder comprising a cylindrical body, a skirt portion, a distal end with a reduced wall thickness adjacent the skirt portion remote from the fluid guiding member and a central passage forming a path for the liquid to pass from the cavity to the fluid guiding member.

5. The device of claim 4, wherein the distal end of the vortex finder has an inclined inner surface.

6. The device of claim 4, wherein the wide open end of each cavity further comprises a cylindrical extension portion, the skirt portion of the vortex finder being disposed in the cylindrical extension portion of a corresponding cavity.

7. The device of claim 6, wherein the fluid distribution member comprises a plurality of distribution passages each having a start section, a cylindrical distal section connected to the cylindrical extension portion of a corresponding cavity, and a transition section connected between the start section and the distal section, the transition section joining to the cylindrical distal section in a tangential.

8. The device of claim 7, wherein the bottom surface of transition section facing the particle separation member is curved.

9. The device of claim 7, further comprising an entry channel that is completely located outside of the chamber of the particle collection member.

10. The device of claim 9, wherein the entry channel is connected to the inlet pipe, the inlet pipe extending in a radial direction of the particle separation member, an outlet section extending in an axial direction of the particle separation member, the outlet section having a conical distal end the diameter of which gradually increases in a direction away from the inlet section, and the start sections of the distribution passages are connected to the conical distal end.

11. The device of claim 10, wherein the fluid distribution member further comprises a protrusion located between the start sections of the distribute passages, the protrusion having a curved surface facing the conical distal end of the entry channel.

12. The device of claim 1, wherein pressure sensors are respectively disposed in the particles separation member and fluid guiding member, and a pH sensor is disposed in the fluid guiding member.

13. The device of claim 1, wherein the particle separation member, fluid guiding member, and particle collection member are made from transparent or translucent materials.

14. The device of claim 13, wherein the materials are thermally stable plastics materials.

15. The device of claim 14, wherein surfaces of the materials for guiding liquid are modified with polymers selected from the group of fluorodecyl polyhedral oligomeric silsesquioxanes.

16. The device of claim 14, wherein the plastics materials are reinforced with mica particles, glass fibers or carbon micro and nano-fibers.

\* \* \* \* \*